Patented Jan. 8, 1952

UNITED STATES PATENT OFFICE 2,582,099

PREPARATION OF SILICA-MAGNESIA BEAD CATALYST

David G. Braithwaite, Chicago, Ill., assignor to National Aluminate Corporation, Chicago, Ill., a corporation of Delaware No Drawing. Application July 9, 1949, Serial No. 103,955

8 Claims. (Cl. 252—448)

This invention relates to an improved silica-magnesia catalyst and to an improved method for the preparation thereof.

In the conversion of hydrocarbon oils, for example, the cracking of gas oil into high knock rating gasoline by the action of catalysts at conversion temperatures, it has been found that catalysts composed of a mixture of active silica and activated magnesia have advantages in producing a larger proportion of gasoline in relation to the production of fixed gases and carbon. This characteristic, known as "a favorable product distribution," increases the realization from products and also makes it possible to operate catalytic conversion processes with these catalysts with a greater proportion of the time in processing and a lesser proportion of time in regenerating the catalysts. The catalyst regeneration is effected by burning the catalyst to remove deposited carbon.

The efficiency of the catalysts is evaluated in the art by "volume activity" and "weight activity."

The silica-magnesia catalysts in use heretofore have suffered from the disadvantages of degeneration and shortened catalyst life during regeneration of the catalyst to remove carbon. The silica-magnesia catalysts heretofore in use also have left much to be desired from the standpoint of product distribution, volume activity and weight activity.

The usual methods of formulating a silica-magnesia catalyst follow the general procedure of precipitating silicic acid from an alkali metal silicate solution and impregnating the gel so formed with a solution of a soluble salt of the metal in question, as, for example, magnesium sulfate. After impregnation with the metal salt solution the metallic hydroxide is usually formed by treating the impregnated gel with an alkali such as an aqueous solution of ammonia. Some manner of purification to eliminate undesirable soluble salts is also an integral part of usual manufacturing procedures.

For the preparation of silica-magnesia catalysts it is also possible to impregnate the precipitated silica gel with magnesium oxide. One such procedure involves an operation called "mulling," where the silica is ground with the magnesium oxide in a manner similar to the grinding of material in a mortar with a pestle.

The mulling operation is tedious and undesirable. The washing of the catalyst and the separation of impurities where such an operation is used presents an additional problem. In all of the prior art procedures heretofore in use it has been practically impossible to obtain a washed silica-magnesia catalyst containing a given magnesium content. In two identical preparations the magnesium content in the final catalyst may vary by as much as 100%.

One of the objects of the present invention is to provide a new and improved silica-magnesia catalyst which is more easily regenerated than silica-magnesia catalysts heretofore in use and has superior carbon burning properties.

Another object of the invention is to provide a silica-magnesia catalyst which when employed in oil cracking produces better product distribution, that is, gives gasoline of higher octane rating or lighter fractions that can be polymerized to give products that are suitable for blending with other fractions to produce final products having a higher octane rating.

Another object of the invention is to provide an improved and simplified method for preparing a silica-magnesia catalyst of a given magnesium content by a process wherein substantially 100% utilization of the raw materials containing magnesium is realized. Other objects will appear hereinafter.

In accordance with the present invention it has been found that a good silica-magnesia cracking catalyst can be prepared by the extremely simple method of slurrying a silica hydrogel with magnesium oxide or magnesium hydroxide in water and heating to a temperature of 125 degrees F. to 175 degrees F. for 30 minutes to 1½ hours. Excellent results on a commercial scale have been obtained by heating the slurry to a temperature of 150 degrees F. and holding that temperature for one hour. In large scale operations it may require several hours to bring the batch up to temperature. In smaller scale operations the batch can be brought to temperature in a shorter time, for example, 30 minutes, and the time required for heating at the given temperature may be shortened to as little as 30 minutes.

Catalysts prepared in accordance with the invention have high apparent bulk density, high volume activity and high weight activity. Furthermore, substantially all of the magnesium is utilized and becomes a component part of the catalyst.

As an illustration of the advantages of the invention from the standpoint of the utilization of the magnesium, if precipitated silica gel washed free of soluble salts is treated with a magnesium oxide slurry of such concentration that a final product containing 30% magnesium oxide equivalent should result and the resultant mixture agitated at room temperature (say 75 degrees F.) for one hour followed by further purification washing steps, the final product so prepared will have magnesium oxide contents ranging from 12% to 15% expressed as magnesium oxide. Thus, a little less than 50% utilization of the raw material magnesium oxide has been realized. If a similar slurry of silica gel washed free of soluble salts and containing magnesium oxide in quantities which should give a final product containing 30% magnesium expressed as magnesium oxide is agitated at 150 degrees F. for one hour, final products containing the theoretical quantity of magnesium are obtained. Following the procedure of the present invention, therefore, almost quantitative conversion of magnesium oxide to magnesia is obtained. In addition, whereas many catalyst samples prepared following slight modifications of the usual procedure have been prepared that are not efficient cracking catalysts, no failures to produce good cracking catalysts have been experienced in the practice of the present invention.

The catalysts of the present invention can also be regenerated to burn off the carbon without the degeneration and deterioration that occurs with silica-magnesia catalysts heretofore used in the oil industry.

The following example will illustrate one specific way of practicing the invention.

Example

Silica hydrogel microspheres were prepared by adding sodium silicate solution (specific gravity 1.69 at 63 degrees F.) and sulfuric acid solution (specific gravity 1.050 at 73 degrees F.) simultaneously to a disc rotating at 3400 revolutions per minute during a period of 3 hours and 35 minutes, during which 1110 gallons of acid and 1180 gallons of silicate solution were used. The disc was placed above 3000 gallons of mineral oil. The silicate hydrogel droplets were thrown from the disc into the mineral oil and a period of about 8 seconds was allowed for gelation of the droplets into microspheres. The resultant microspheres passed through the mineral oil into a body of water, and the resultant aqueous slurry was pumped to conical washers and washed to less than 0.1% sodium oxide dry weight. After the initial wash the supernatant water was syphoned and 1915 gallons of slurry containing 62.7% silica hydrogel microspheres was obtained.

To this slurry was added 450 pounds of 200 mesh magnesium oxide in the form of a concentrated slurry made by mixing 145 parts by weight of the magnesium oxide with 650 parts by weight of water.

The mixture was stirred and heated with steam for 3½ hours, during which time the temperature rose from room temperature to 150 degrees F. The 150 degree temperature was maintained for an additional hour. A final wash of approximately 3 hours was employed.

The product was dried in a roto kiln at 500 degrees F. to 800 degrees F. to a moisture content of 10% to 15% by weight.

The finished material composite had the following chemical analysis:

| | |
|---|---|
| Loss on ignition | 6.58 |
| $SiO_2$ | 68.37 |
| MgO | 23.65 |
| $Na_2O$ | 0.064 |
| $R_2O_3$ | 0.76 |
| Particle size on 40 mesh | 0 |
| Particle size on 70 mesh | 1.6 |
| Particle size on 100 mesh | 5.7 |
| Particle size on 200 mesh | 39.3 |
| Particle size on 270 mesh | 30.0 |
| Particle size through 270 mesh | 23.4 |

The evaluation of this material showed that it had the following characteristics:

| | |
|---|---|
| Apparent bulk density | 0.64 |
| Volume activity | 114 |
| Weight activity | 89 |

This product was a very good cracking catalyst and had superior carbon burning properties upon regeneration. It also had improved product distribution characteristics.

In the foregoing example the magnesium oxide may be substituted by the chemically equivalent amounts of magnesium hydroxide. Other methods may be used to prepare the silica hydrogel microspheres. In general, it is old in the chemical arts to prepare various types of chemical substances in globular or spherical form by allowing droplets to pass through a water immisible medium into an aqueous medium. Other methods for preparing globular or spherical materials are also known.

The quantities of silicate and acid required to react to form silica hydrogels and the conditions of this reaction are in general well known. See "The Hydrous Oxides" by H. B. Weiser, first edition (1926), McGraw-Hill International Chemical Series, page 197. See also Inorganic Colloidal Chemistry by H. B. Weiser, vol II, entitled "The Hydrous Oxides and Hydroxides," John Wiley & Sons Company (1935), pages 17, 18 and 193. The general method of forming globules and causing a solution to impinge on a rotating disc is shown in British Patent 313,652. The general idea of causing solidification of globules to take place in a water immiscible liquid is shown by British Patents 233,720, 313,652 and 314,639. Other ways of preparing globular or spherical bodies from chemical substances are described in British Patent 300,141.

Although the present invention is particularly useful in the prepartion of catalysts in the form of microspheres, the general principle of heating a silica hydrogel body with magnesium oxide or magnesium hydroxide as herein described in order to secure a product having a greater magnesium content and enhanced effectiveness and utility is applicable to the preparation of silica hydrogel catalysts in other forms. The utilization of the silica hydrogel in the form of microspheres in conjunction with the other steps of the process herein described results in a catalyst which can be washed to remove particles of magnesium oxide or magnesium hydroxide finer than 200 mesh, which, if allowed to remain in the catalyst, would be undesirable.

In heating the intimate mixture of the silica hydrogel and the magnesium oxide or magnesium hydroxide, it is preferable to avoid heating to temperatures at which steam is generated because too much heat tends to soften the microspheres.

The time of heating is governed in general by the time required to obtain optimum inclusion of the magnesium oxide or magnesium hyroxide. A longer time of heating beyond that required to obtain the optimum inclusion merely adds to the cost of the process.

The quantity of magnesium oxide or magnesium hydroxide employed for the purpose of the invention may be varied, depending upon the particular use of the catalyst. The invention is especially advantageous, however, where catalysts are desired containing relatively large amounts of magnesia, that is, within the range of 15% to 30% by weight on a dry basis calculated as magnesium oxide.

The process of the invention not only produces a catalyst of improved properties but also is simple to carry out and involves no special operations other than the simple steps of mixing, washing and drying.

The invention is hereby claimed as follows:

1. A process for the preparation of an improved silica-magnesia catalyst which consists essentially in intimately mixing a silica hydrogel with a compound from the group consisting of magnesium oxide and magnesium hydroxide in an aqueous slurry at a temperature of 125 degrees F. to 175 degrees F. for ½ hour to 1½ hours, separating the water and drying the resultant catalyst.

2. A process for the preparation of an improved silica-magnesia catalyst which consists essentially in intimately mixing a silica hyrogel and magnesium oxide in an aqueous slurry at a temperature of 125 degrees F. to 175 degrees F. for ½ hour to 1½ hours, separating the water and drying the resultant catalyst.

3. A process for the preparation of an improved silica-magnesia catalyst which consists essentially in intimately mixing a silica hydrogel and magnesium hydroxide in an aqueous slurry at a temperature of 125 degrees F. to 175 degrees F. for ½ hour to 1½ hours, separating the water and drying the resultant catalyst.

4. A process for the preparation of an improved silica-magnesia catalyst which consists essentially of intimately mixing silica hydrogel microspheres and a magnesium compound from the group consisting of magnesium oxide and magnesium hydroxide in an aqueous slurry at a temperature within the range of 125 degrees F. to 175 degrees F. for a period of ½ hour to 1½ hours, separating the water and drying to a moisture content of 10% to 15% at a temperature of 500 degrees F. to 800 degrees F.

5. A process for the preparation of an improved silica-magnesia catalyst which consists essentially of intimately mixing silica hydrogel microspheres and magnesium oxide in an aqueous slurry at a temperature within the range of 125 degrees F. to 175 degrees F. for a period of ½ hour to 1½ hours, separating the water and drying to a moisture content of 10% to 15% at a temperature of 500 degrees F. to 800 degrees F.

6. A process for the preparation of an improved silica-magnesia catalyst which consists essentially of intimately mixing silica hydrogel microspheres and magnesium hydroxide in an aqueous slurry at a temperature within the range of 125 degrees F. to 175 degrees F. for a period of ½ hour to 1½ hours, separating the water and drying to a moisture content of 10% to 15% at a temperature of 500 degrees F. to 800 degrees F.

7. A process for the preparation of an improved silica-magnesia catalyst which consists in intimately mixing silica hydrogel microspheres and magnesium oxide in an aqueous slurry at a temperature of about 150 degrees F. for about one hour, separating the water from the slurry and drying to a moisture content of 10% to 15% moisture.

8. A process for the preparation of an improved silica-magnesia catalyst which comprises intimately dispersing silica hydrogel microspheres having a sodium oxide content less than 0.1% with magnesium oxide in the proportions theoretically required to produce a product having a magnesium content within the range of 15% to 30% calculated as magnesium oxide for a period of about one hour at a temperature of about 150 degrees F. with an aqueous slurry, separating the water from the slurry and drying the silica-magnesia microsphere particles at a temperature of 500 degrees F. to 800 degrees F. to a moisture content of 10% to 15% by weight.

DAVID G. BRAITHWAITE.

REFERENCES CITED

The following references are of record in the file of this patent:

UNITED STATES PATENTS

| Number | Name | Date |
|---|---|---|
| 2,399,261 | Thomas | Apr. 30, 1946 |
| 2,435,158 | Read | Jan. 27, 1948 |